United States Patent
Boschiero et al.

(10) Patent No.: US 10,875,137 B2
(45) Date of Patent: Dec. 29, 2020

(54) SELECTING DEVICE FOR A SPRINGS FORMING MACHINE, AND SPRINGS FORMING MACHINE PROVIDED WITH SUCH SELECTING DEVICE

(71) Applicant: Simplex Rapid S.r.l., San Giuliano Milanese (IT)

(72) Inventors: Giuseppe Boschiero, San Giuliano Milanese (IT); Paolo Boschiero, San Giuliano Milanese (IT)

(73) Assignee: SIMPLEX RAPID S.R.L., San Giuliano Milanese (IT)

(*) Notice: Subject to any disclaimer, the term of this patent is extended or adjusted under 35 U.S.C. 154(b) by 449 days.

(21) Appl. No.: 15/858,810

(22) Filed: Dec. 29, 2017

(65) Prior Publication Data

US 2018/0185973 A1 Jul. 5, 2018

(30) Foreign Application Priority Data

Jan. 4, 2017 (IT) .................. 102017000000824

(51) Int. Cl.
*B07C 5/36* (2006.01)
*B23Q 7/12* (2006.01)
(Continued)

(52) U.S. Cl.
CPC ............. *B23Q 7/12* (2013.01); *B07C 5/3422* (2013.01); *B07C 5/36* (2013.01); *B21C 51/00* (2013.01);
(Continued)

(58) Field of Classification Search
CPC .......... B23Q 7/12; B23Q 7/08; B07C 5/3422; B07C 5/35; B21F 3/02; B21F 35/00; B21C 51/00
See application file for complete search history.

(56) References Cited

U.S. PATENT DOCUMENTS 4,109,511 A * 8/1978 Powers, Jr. ......... G01M 3/3236
209/522
4,223,751 A * 9/1980 Ayers ........................ B07C 5/16
177/210 C (Continued)

FOREIGN PATENT DOCUMENTS

DE 102012204344 A1 9/2013
EP 0372872 A2 6/1990
JP 2002079339 A 3/2002

OTHER PUBLICATIONS

Italian Search Report dated Sep. 15, 2017; 87 pages.

*Primary Examiner* — Patrick H Mackey
(74) *Attorney, Agent, or Firm* — Mark Malek; Widerman Malek, PL

(57) ABSTRACT

The present invention relates to a selecting device to be disposed downstream of a springs forming device of a springs forming machine. The selecting device may include an inlet adapted to receive springs formed in the springs forming device, outlets adapted to eject each of the springs from the selecting device, means for selectively conveying each of the springs entering the selecting device through the inlet towards the outlets, and means to form conduits to connect the inlet to the outlets. The selecting device may include means for generating a depression in at least one of the conduits and means for generating a compressed air flow directly inside the selecting device at one of the conduits.

5 Claims, 4 Drawing Sheets

(51) Int. Cl.
  *B23Q 7/08* (2006.01)
  *B21C 51/00* (2006.01)
  *B21F 35/00* (2006.01)
  *B07C 5/342* (2006.01)
  *B21F 3/02* (2006.01)

(52) U.S. Cl.
  CPC ............... *B21F 3/02* (2013.01); *B21F 35/00* (2013.01); *B23Q 7/08* (2013.01)

(56) References Cited

U.S. PATENT DOCUMENTS

| | | | | |
|---|---|---|---|---|
| 4,901,841 | A * | 2/1990 | Haggerty | B65B 35/34 |
| | | | | 198/358 |
| 4,991,277 | A * | 2/1991 | Itaya | B21F 3/00 |
| | | | | 140/71.5 |
| 5,456,392 | A * | 10/1995 | Majors | B07C 5/361 |
| | | | | 209/571 |
| 6,732,498 | B2 * | 5/2004 | Keen | B65B 65/08 |
| | | | | 198/471.1 |
| 7,042,231 | B2 * | 5/2006 | Trebbi | A61J 3/074 |
| | | | | 324/639 |
| 7,353,680 | B1 * | 4/2008 | Huang | B21F 3/02 |
| | | | | 72/132 |
| 2020/0222944 | A1 * | 7/2020 | Hattori | B07C 5/361 |

* cited by examiner

SELECTING DEVICE FOR A SPRINGS FORMING MACHINE, AND SPRINGS FORMING MACHINE PROVIDED WITH SUCH SELECTING DEVICE

RELATED APPLICATIONS

This application claims priority to Italian Patent Application Serial No. 102017000000824 filed on Jan. 4, 2017 and titled Selecting Device for a Springs Forming Machine, and Springs Forming Machine Provided with Such Selecting Device, the entire content(s) of which is/are incorporated herein by reference

FIELD OF THE INVENTION

The present invention refers to a selecting device for a springs forming machine, and a springs forming machine provided with such selecting device.

BACKGROUND

The springs forming machines, also known as springs coilers, comprise a device for forming spiral springs from a wire, normally a metal wire. The springs must be made with a predefined pitch, number of coils and length, falling into determined tolerance limits.

Moreover, the known machines further comprise a vision system which scans each of the formed springs, which are supplied to a control unit of the machine itself for verifying the dimensional parameter.

Downstream the forming device, the coiler further comprises a selecting device which, based on the result of the step of verifying the parameters performed by a control unit, subdivides each formed spring in two or more groups, for example subdivides the springs in a first group corresponding to springs falling into the predefined tolerances, and in a second group comprising out-of-tolerance springs. As an alternative, the selecting device can subdivide the manufactured springs in more than two groups. Generally, the selecting device comprises an inlet in which the springs formed into the forming device enter, and at least two distinct outlets subdividing the springs into distinct groups according to what has been discussed before. One or more movable blades, commanded by the control unit, guide the entering spring towards the outlet corresponding to the group to which the spring is destined.

The increasingly high manufacturing speeds causes the selecting device to commit errors during the selecting step. Therefore, an out-of-tolerance spring can by mistake fall in the group of the suitable-deemed springs. Therefore, a run of suitable-deemed springs could on the contrary comprise one or more out-of-tolerance springs, so that this run will be entirely compromised for this reason.

Another problem that can happen is caused by a spring getting jammed inside the selecting device which can be consequently damaged so that this spring will be also considered unsuitable.

Even though the dimensional analysis and the following step of subdividing the springs into groups are correct, what was discussed hereinbefore happens substantially due to the non-perfect synchronization between the springs dropping into the selecting device and the real selection made by the selecting device. Moreover, it is necessary to take into consideration that, even though initially it is possible to determine operative parameters of the selecting device which are capable of ensuring the synchronization, the time required to a spring to fall is not always constant over time and, especially at high manufacturing rates, small variations of several operative variables can determine a substantial variation.

Spring forming systems according to the prior art are described in documents DE 10 2012 204344 A1, JP 2002 079339 A, EP 0 372 872 A2, U.S. Pat. Nos. 4,991,277 A, 7,353,680 B1.

This background information is provided to reveal information believed by the applicant to be of possible relevance to the present invention. No admission is necessarily intended, nor should be construed, that any of the preceding information constitutes prior art against the present invention.

SUMMARY OF THE INVENTION

Therefore, it is an object of the present invention to make available a selecting device for a springs forming machine, and also a springs forming machine provided with such selecting device, having a configuration such to ensure a fall time of the springs which is adequately constant for reducing, over time, the risk of disrupting the synchronization between the fall of the springs into the selecting device and the effective selection performed by this latter.

This and other objects are obtained by a selecting device for a springs forming machine according to claim 1, a selecting device for a springs forming machine according to claim 16, a springs forming machine according to claim 15 and a springs forming machine according to claim 20.

Dependent claims define possible advantageous embodiments of the invention.

DETAILED DESCRIPTION OF THE INVENTION

Figure 1:
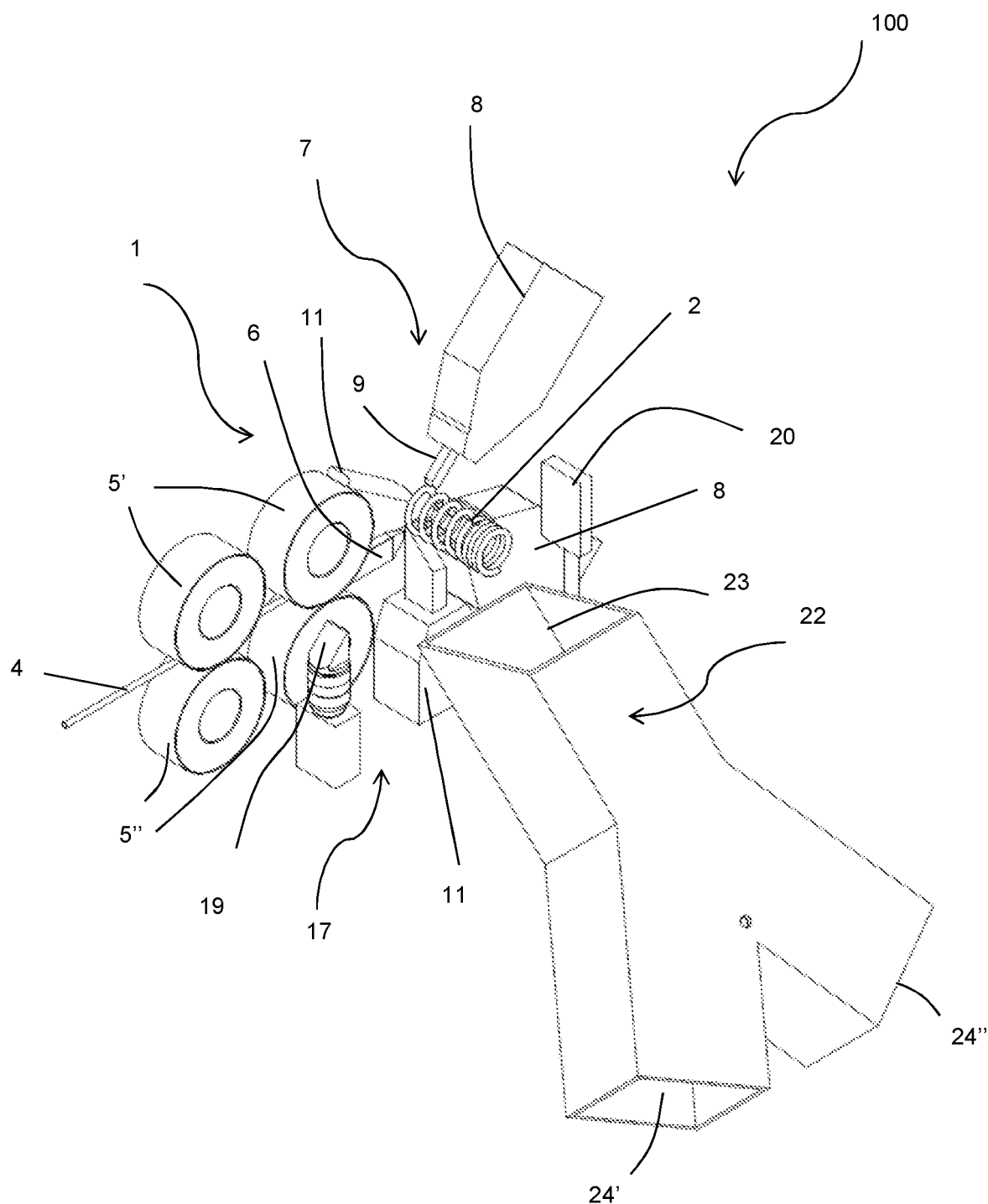
FIG. 1 is a perspective schematic view of a springs forming machine comprising a selecting device.

Referring to FIG. 1, reference 100 indicates a springs forming machine.

The machine 100 comprises a springs forming device 1. Such device 1 comprises a system for supplying a wire 4 in turn supplied by a supplying system 3, which after being suitably deformed, will be formed into a spring 2. The wire 4 is for example withdrawn from a spool, not illustrated in the figures. The supplying system 3 preferably comprises one or more pairs of facing rolls 5, 5' pulling the wire for example through a wire guide 6.

Moreover, the device 1 comprises a coiling system 7 for coiling the wire 4 supplied by the supplying system 3. Advantageously, the coiling system 7 comprises one or more coiling tools 8 having the function of coiling the wire 4 as a helix. Moreover, the device 1 can comprise one or more pitch tools 11 shaped for acting on the wire 4 so that the cylindrical helix followed by the wire itself by means of the coiling system 7, had a predefined pitch.

Further, the device 1 comprises a cutting tool (not shown in the figures) for separating the spring formed by the device 1, from the wire 4 which is activated in the coiling system 7, once finished the spring itself.

In addition, the springs forming machine 100 comprises a measuring system 17 configured for detecting the dimensional parameters of each spring formed in the forming device. For example, such system can comprise a camera 19 and illuminator 20 placed at a distance from the coiling system 7 corresponding to the final length set for the spring.

Further, the machine 100 comprises a selecting device 22 operatively disposed downstream the springs forming device 1. The selecting device 22 comprises an inlet 23 in which each spring formed in the forming device 1 enters, and a plurality of outlets 24', 24" . . . towards which the above cited spring 2 is conveyed based on dimensional characteristics thereof. Particularly, the selecting device 22 is configured for subdividing the springs entering through the inlet 23 into at least two groups, particularly in a first group corresponding to springs having dimensional parameters (for example the length) falling into predefined tolerance values, and in a second group corresponding to springs having dimensional parameters different from said predefined dimensional values. The springs of the first group are suitable, while the springs of the second group are considered faulty and therefore must be rejected. Naturally, the selecting device 22 can subdivide the springs into a number of groups greater than two, corresponding to an equal number of outlets. Possibly, more than one group can be destined to faulty springs to be rejected, and more than one group can be destined to suitable springs to be stored. For example, a group can include rejected springs because are too long, and a further group can include rejected springs which are too short. With reference to the group of suitable springs, for example, a group can contain suitable springs but showing the tendency of being too long, and a further group can comprise suitable springs but showing the tendency of being short, to be subjected to dedicated grindings.

In the following, it is exemplifyingly made reference for the sake of comprehension, to the case of only to outlets 24' and 24" and of subdividing the springs in only two groups: suitable springs because falling into acceptable predefined tolerance limits (first group), and faulty springs because do not fall into such tolerance limits (second group).

Referring to Figures from 2 to 6, the selecting device 22 comprises means for selectively conveying each spring entering through the inlet 23 into the outlets 24', 24", . . . according to the group to which the spring belongs based on the performed selection.

Figure 2A:
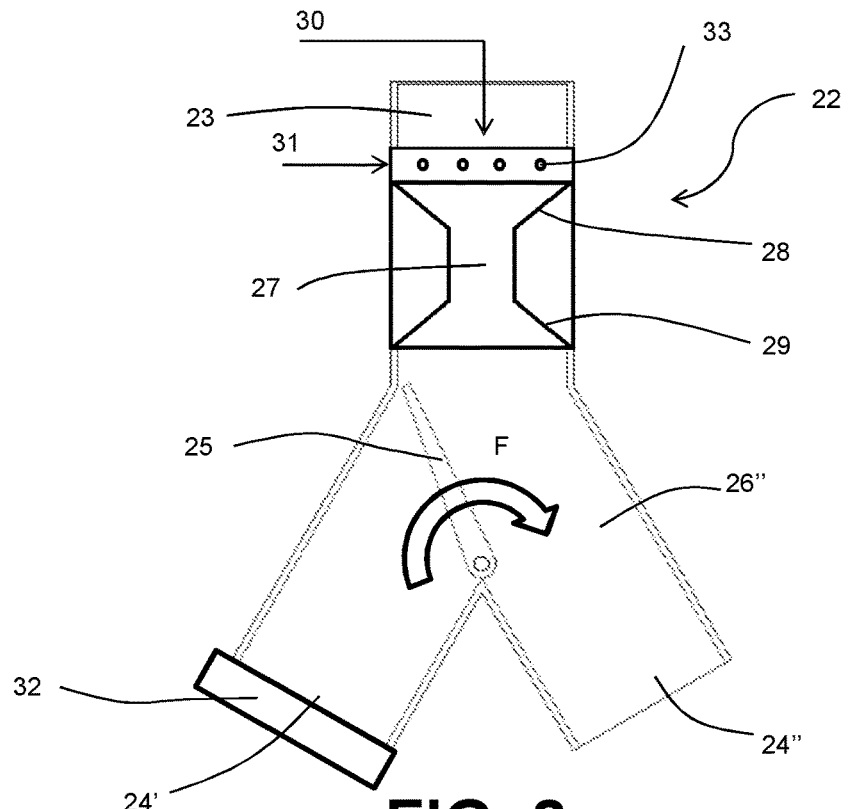
FIGS. 2a and 2b are partially phantom front schematic views, of a selecting device according to a possible embodiment of the invention, according to two different operative configurations.

According to a possible embodiment, the selection performed by the selecting device 22 is implemented by at least one blade 25 movable inside the selecting device 22 which deflects each spring from the inlet 23 towards the outlet 24' or 24" corresponding to the group of the spring based on the dimensional parameters thereof as detected and analyzed. The blade 25 can for example take the arrangements illustrated in FIGS. 2a and 2b, by moving along the arrow F. In the configuration of FIG. 2a, the blade 25 deflects the springs entering the inlet 23 towards the outlet 24", while, in the configuration of FIG. 2b, the blade 25 deflects the springs entering the inlet 23 towards the outlet 24'. For example, the blade 25 can be moved by an electric motor, preferably by means of a stepper motor or, alternatively, by a pneumatic cylinder or actuator (not shown in the figures). Preferably, it is observed that the blade 25 is normally held in a position such to convey the springs to the second group (faulty springs) and is moved to a position such to convey the springs to the first group (suitably springs) only when necessary, then it returns to the normal position at the end of the selection step. Moreover, it is observed that, according to a not illustrated embodiment variant, the selecting device 22 can comprise a plurality of blades 25 for performing the selection in more than two groups.

The blade/s 25, or generally the selective springs conveying means, according to the attained configuration, define/s in the selecting device 22, conduits connecting the inlet 23 to a specific outlet. For example, when the blade 25 is placed in the position shown in FIG. 2a, a conduit 26" connecting the inlet 23 to the outlet 24" is defined, while when the blade 25 is placed in the position shown in FIG. 2b, a conduit 26' connecting the inlet 23 to the outlet 24' is defined.

Advantageously, the selecting device 22 comprises means configured for forming a depression in at least one of such conduits 26' and 26". It is observed that, in the present description and in the attached claims, the term "depression" refers to a pressure less than a pressure at the inlet 23 in the considered conduit, wherein the spring enters the selecting device 22. The depression causes, unlike the selecting devices lacking these means, each spring to be suctioned inside the conduit, while accelerating, so that both the trajectory and speed thereof and consequently the falling time, are made more stable. Therefore, the variations of these parameters are limited among following springs. This causes the springs exiting the selecting device to exit one of the outlets with an approximately constant rate.

The means for forming the depression can be made in different ways.

According to an embodiment, the means for establishing the depression comprise a channel 27 comprising a converging length 28 preferably followed by a diverging length 29 placed in one of the formed conduits due to the variation of the configuration of the selective conveying means. One example of this type of channel is known as Venturi tube. The principle underlying the operation of the converging-diverging conduit is that a fluid flowing through a choke is subjected, due to the choke itself, to a speed increase and to a pressure decrease, in other words a depression, this is the phenomenon which one intends to exploit in the selecting device according to the invention for regularly suctioning the springs into the conduits 26' and 26".

The channel 27 can be placed and configured differently.

Figure 2B:
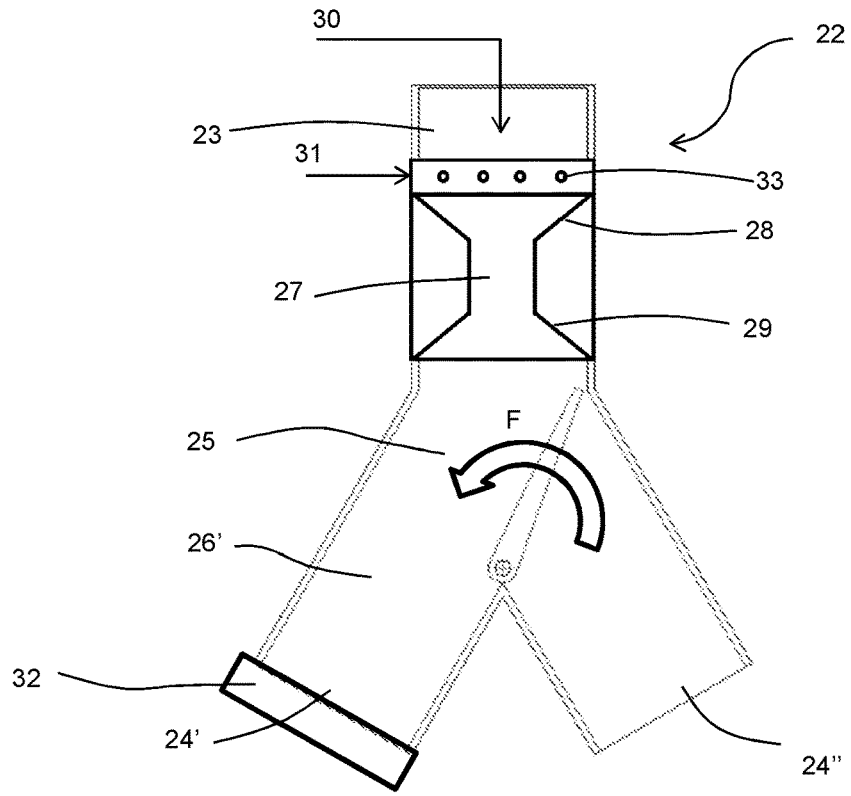

According to a possible embodiment, the channel 27 is disposed between the inlet 23 and the selective conveying means, for example the blade/s 25 (FIGS. 2a-2b). In this way, the channel 27 is capable of generating a depression on both the conduits 24' and 24" which are formed as a function of the result of the selecting step, due to the position of the blade 25.

Advantageously, the selecting device 22 further comprises first means 30 for generating a compressed air flow at the inlet 23 from the outside of this latter. This means that the effect generated by the channel 27 will be amplified since the spring enters the selecting device 22 immersed in an air flow having a determined speed and determined pressure, and is accelerated due to the choke, which causes a speed increase and a pressure decrease, at the channel 27 itself.

Preferably, the compressed air flow is concentrated and directed towards the center of the conduit starting from the inlet 23. For example, such first means 30 comprise a nozzle connected to a compressed air source, wherein said nozzle (not shown in the figures) is placed in proximity of the inlet 23 outside this latter. The first means 30 have also the function of pushing the springs inside the selecting device.

More advantageously, for further amplifying the effect of the depression, the selecting device 22 in addition comprises second means 31 for generating a compressed air flow inside the selecting device, in other words, with reference to the embodiments illustrated, directly inside the conduits 26' and/or 26". The second compressed air generating means 31 differ from the first compressed air generating means 30 because the first means 30 generate the compressed air flow from the outside of the selecting device, on the contrary the second means 31 act inside the selecting device, in other words the compressed air flow supplied by the second means 31 does not initially flow through the inlet 23 to the conduits 26'/26", but is directly blown in them. Preferably, the second means 31 for generating the compressed air flow are disposed upstream the converging length 28 of the channel 27, in other words upstream the choke formed by this latter, if this one is provided (as it will be described in the following). In the present description and in the attached claims, the terms "upstream" and "downstream" refer to the direction of the motion of the springs inside the selecting device, in other words, from another point of view, to the direction of the compressed air flow entraining them, therefore from the inlet 23 towards the outlet 24', 24", . . . . Preferably, the second means 31 comprise a plurality of holes disposed along the periphery of the channel 27, by means of them the compressed air is blown along a direction sloped towards said choke.

The channel 27, shaped in this way, can be made in one piece with the selecting device 22 itself, or, as an alternative, can be separable from it for being replaced with a further channel having a different size, particularly a different opening at the choke, so that the selecting device can be exploited for springs having different diameters.

Figure 3:
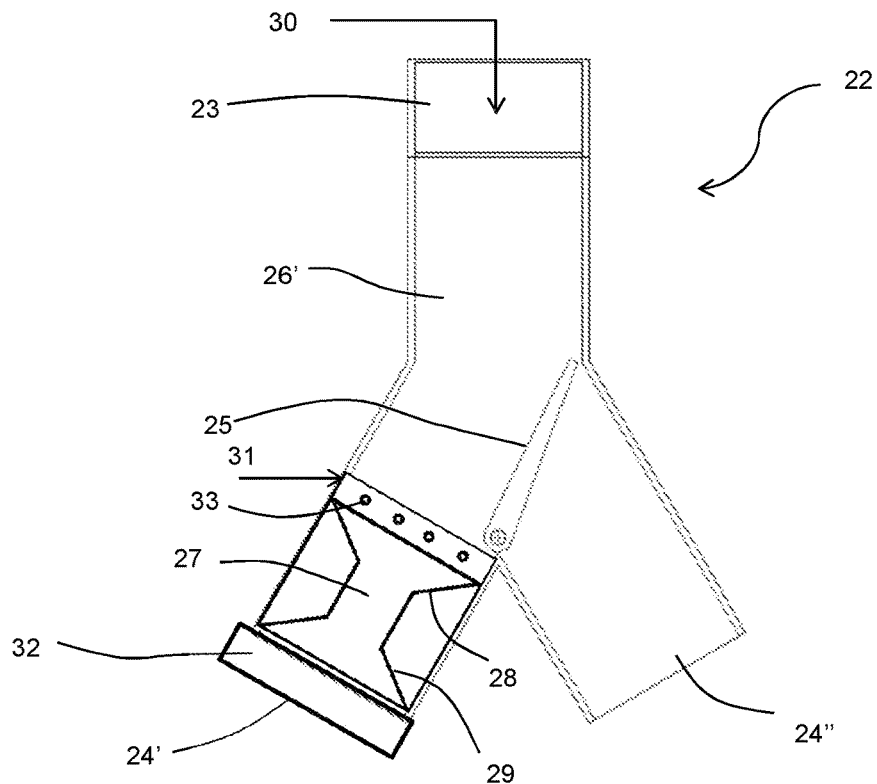
FIG. 3 is a partially phantom front schematic view of the selecting device according to a further possible embodiment of the invention.
Figure 4:
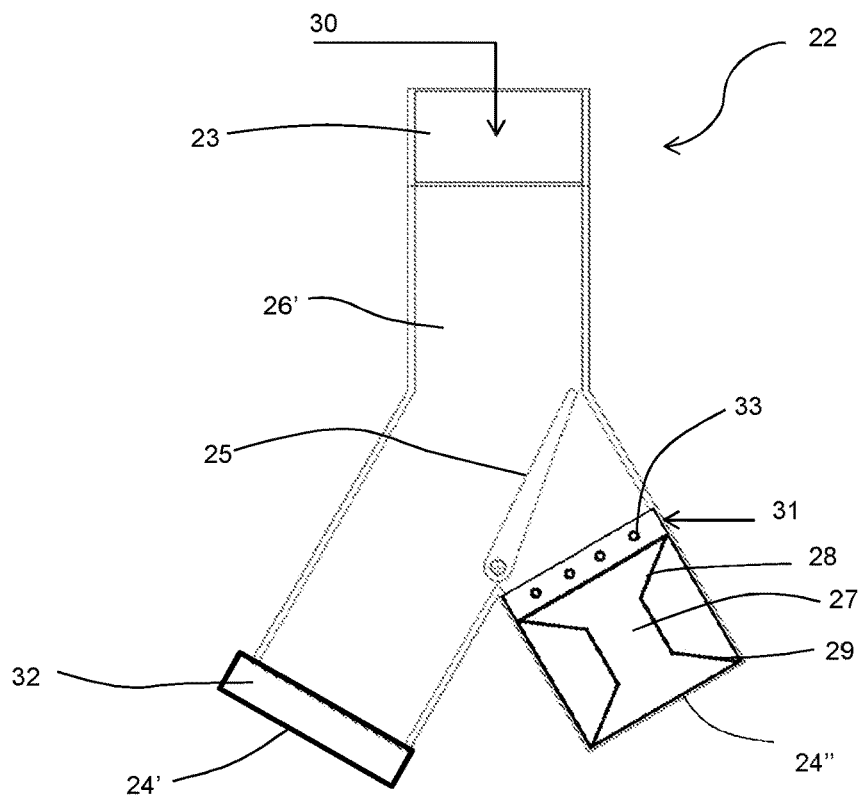
FIG. 4 is a partially phantom front schematic view of the selecting device according to a further possible embodiment of the invention.

As an alternative or in addition, the channel 27 can be disposed downstream the selective conveying means, in other words between these latter and one or more of the outlets 24', 24" (FIGS. 3 and 4). In this case, the depression is generated in proximity of the outlet 24' and/or 24" of the selecting device, however the effect thereof extends adjacently the inlet 23. Also in this case, the channel 27 can be made in one piece with the selecting device or can be removable and replaceable. Further, also according to this variant, it is possible to provide the second compressed air generating means 31.

According to a possible embodiment, the channel 27 is widthwise adjustable, in other words it is possible to adjust the opening of the channel 27 at the choke between the converging length 28 and diverging length 29, in order to adapt the spring selecting device to different sizes without requiring to replace components.

Figure 5:
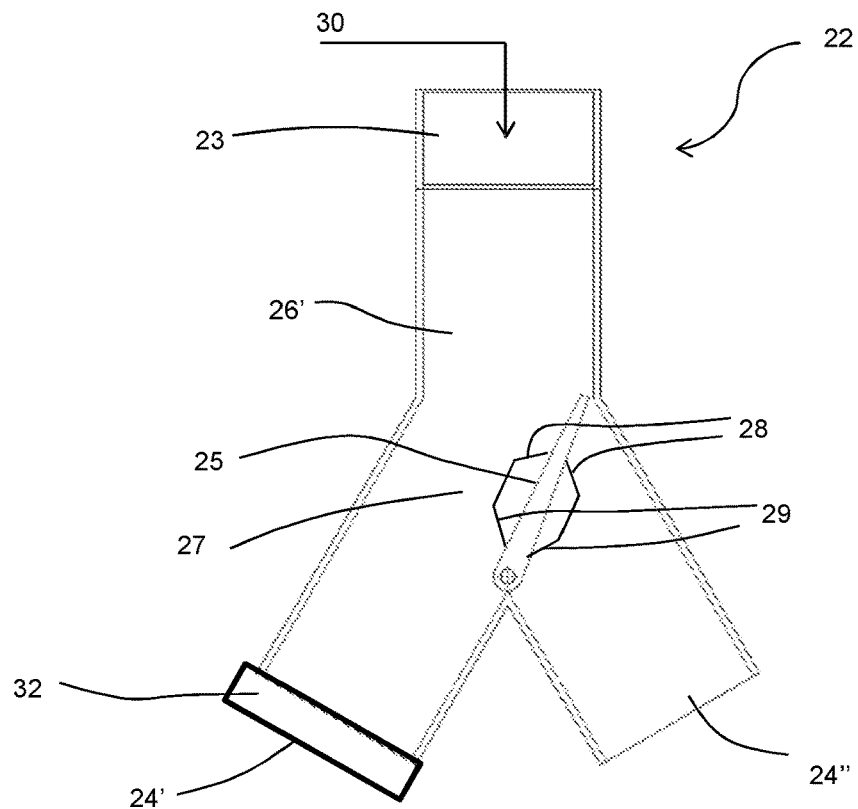
FIG. 5 is a partially phantom front schematic view of the selecting device according to a further possible embodiment of the invention.

According to a possible further embodiment, the channel 27 is defined by the blade/s 25, which for this reason, can exhibit a converging-diverging pattern in order to create the desired depression (FIG. 5).

Figure 6:
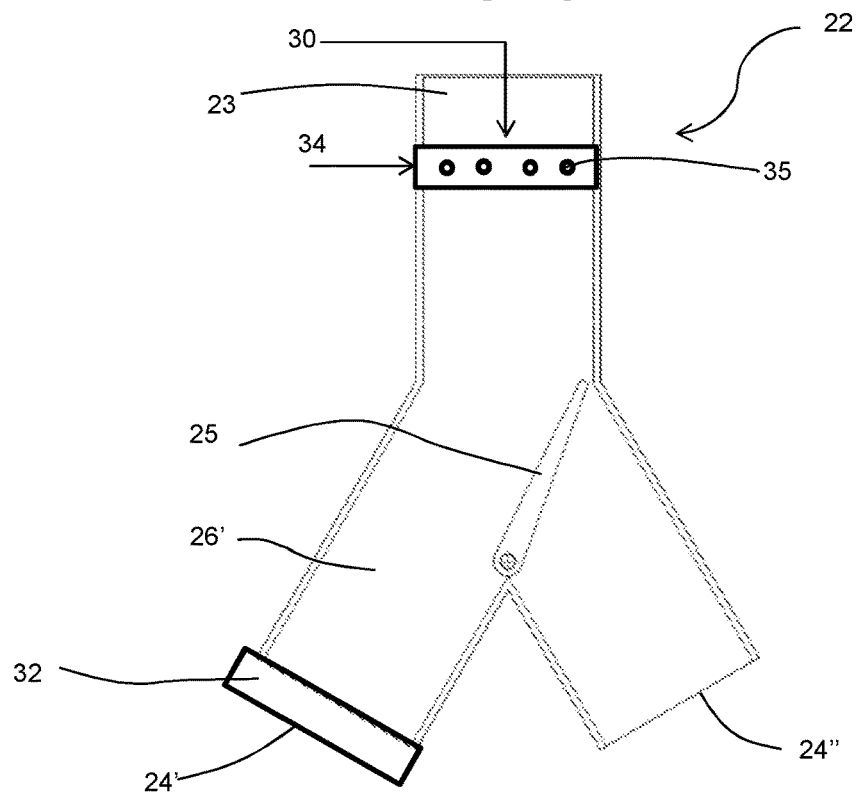
FIG. 6 is a partially phantom front schematic view of the selecting device according to a further possible embodiment of the invention.

According to a further embodiment variant (FIG. 6), the selecting device can comprise means for generating a compressed air flow inside the selecting device, having characteristics analogous to the ones described with reference to the second means 31 for generating compressed air inside the selecting device, also without the channel 27. For example, the selecting device can comprise third means 34 for generating compressed air directly inside the selecting device 22 at at least one of said first 26' and second conduits 26". According to a possible embodiment, the third means 34 comprise a plurality of holes 35 disposed along the periphery of the walls of the selecting device, forming the conduits 26', 26" by means of them the compressed air is blown along a sloped direction so that the compressed air flow is directed towards the outlets 24', 24" of the selecting device. Such configuration enables in any case to thrust the springs into the conduits 26'/26" also without the additional depressing effect provided by the shape of the channel 27. The third compressed air generating means 34 are preferably positioned upstream the selective conveying means, for example upstream the blade 25.

According to a further aspect of the present invention, the selecting device 22 comprises at least one sensor 32 disposed at one of the outlets 24', 24", . . . of the selecting device 22, shaped for detecting the springs passing through the same. Just as an illustrative example, such sensor 32 can comprise different types of sensors such as a camera. Preferably, the sensor 32 is disposed at least at the outlets/s allocated to suitable springs, in other words to springs falling into accepted dimensional tolerances. In this way, it is possible to monitor the rate by which suitable springs exit the selecting device, in this way it is verified at a later stage if there were synchronization problems between when the springs fall and the selection by the selecting device.

In addition, according to a variant not illustrated in the figures, a further sensor 32 can be provided at the outlet/s corresponding to the unsuitable springs, so that the overall production of the springs exiting the selecting device is monitored.

It is observed that, according to a further aspect of the present invention, the sensor/s 32 can be also provided in a selecting device lacking the depression generating means and/or compressed air flow generating means inside the selecting device according to what was previously described.

To the described embodiment, a person skilled in the art, in order to meet contingent specific needs, could add many additions, modifications, or substitutions of elements with other operatively equivalent, without falling out of the scope of the attached claims.

While the above description contains much specificity, these should not be construed as limitations on the scope of any embodiment, but as exemplifications of the presented embodiments thereof. Many other ramifications and variations are possible within the teachings of the various embodiments. While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best or only mode contemplated for carrying out this invention, but that the invention will include all embodiments falling within the scope of the appended claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

Thus the scope of the invention should be determined by the appended claims and their legal equivalents, and not by the examples given.

That which is claimed is:

1. A selecting device destined to be disposed downstream a springs forming device of a springs forming machine, comprising:
    an inlet adapted to receive each of the springs formed in the springs forming device;
    at least one first and one second outlets adapted to expel each of said springs from the selecting device, for separating them in at least one first and one second groups;
    means for selectively conveying each of said springs entering the selecting device through the inlet towards the first or second outlet, configurable according to at least one first configuration, wherein said selective conveying means form a first conduit connecting the inlet to the first outlet, and a second configuration, wherein said selective conveying means form a second conduit connecting the inlet to the second outlet,
    means for generating compressed air directly inside the selecting device at at least one of said first and second conduits, wherein said means for generating compressed air comprises a plurality of holes disposed along the periphery of the walls of the selecting device, forming said at least one first and one second conduits, such to blow compressed air along a direction sloped towards said at least one first and one second outlets of the selecting device;
    wherein said first and second conduits are closed and continuous; and
    wherein said means for selectively conveying each of said springs forms a wall portion of said first and second conduits.

2. The selecting device according to claim 1, wherein said means for generating compressed air are positioned upstream said selective conveying means.

3. The selecting device according to claim 1, comprising at least one sensor disposed at at least one of the first and the second outlets, configured for detecting the passages of each spring through the same.

4. The selecting device according to claim 3, wherein said first group corresponds to a group of suitable springs falling into predefined tolerance limits, and said second group corresponds to a group of defective springs not falling into said tolerance limits, said at least one sensor being disposed at at least said first outlet.

5. A machine for forming springs, comprising:
    a springs forming device; and
    a selecting device according to claim 1.

* * * * *